(12) United States Patent
Cheung (10) Patent No.: US 7,133,299 B2
(45) Date of Patent: Nov. 7, 2006

(54) ZERO VOLTAGE SWITCHING POWER CONVERSION CIRCUIT

(75) Inventor: Matthew Cheung, Hong Kong (HK)

(73) Assignee: Pi International Ltd., Tortola (VG)

( * ) Notice: Subject to any disclaimer, the term of this patent is extended or adjusted under 35 U.S.C. 154(b) by 261 days.

(21) Appl. No.: 10/753,428

(22) Filed: Jan. 9, 2004

(65) Prior Publication Data
US 2005/0152161 A1 Jul. 14, 2005

(51) Int. Cl.
*H02M 3/335* (2006.01)
(52) U.S. Cl. ............................ 363/24; 363/16; 363/134
(58) Field of Classification Search ................. 363/15, 363/16, 24, 25, 26, 131, 134
See application file for complete search history.

(56) References Cited

U.S. PATENT DOCUMENTS

| | | | | |
|---|---|---|---|---|
| 4,334,267 A | * | 6/1982 | Miko .......................... | 363/133 |
| 4,553,199 A | * | 11/1985 | Harada et al. ................. | 363/75 |
| 4,603,307 A | * | 7/1986 | Voight et al. ............. | 331/113 A |
| 4,858,096 A | * | 8/1989 | Onda et al. .................... | 363/22 |
| 5,668,466 A | * | 9/1997 | Vinciarelli et al. ......... | 323/282 |

* cited by examiner

*Primary Examiner*—Jeffrey Sterrett
(74) *Attorney, Agent, or Firm*—Rosenbergm Klein & Lee (57) ABSTRACT

A switching power conversion circuit comprises a saturable load assembly, a first switching inductance coil assembly and a second switching inductance coil assembly. The saturable load assembly is composed of a load and a saturable reactor. The first switching inductance coil assembly is connected to the saturable load assembly and a first potential. The second switching inductance coil assembly is magnetically coupled with the first switching inductance coil assembly, and is connected to the first switching inductance coil assembly and a second potential. When the first and second switching inductance coil assemblies are power switched, the saturation effect of the saturable reactor is exploited to let the terminal potential of the saturable reactor drop before switching, hence letting the terminal potential of the transfer switch be zero.

9 Claims, 7 Drawing Sheets

ZERO VOLTAGE SWITCHING POWER CONVERSION CIRCUIT

FIELD OF THE INVENTION

The present invention relates to a switching power conversion circuit and, more particularly, to a switching power conversion circuit, which makes use of switches having a zero crossover voltage for power switching.

BACKGROUND OF THE INVENTION

For high-efficiency switching power converter, because the whole load current will flow through a switch when switching, the switch has to bear a very high switching stress and a high switching loss proportional to the switching frequency, zero voltage switching is a very important technique.

Besides, time-varying current and time-varying voltage caused by high-speed switching will result in serious electromagnetic interference (EMI).

In order to reduce the size and weight of a converter and enhance its power density, it is necessary to increase its switching frequency, which will more deteriorate the drawbacks of the switching converter. If the voltage of the switch can be made zero at the instant of switching, the above drawbacks can be improved. Therefore, how to reduce the switching loss, the switching stress and EMI of a switching converter is a very important problem to be urgently solved in this industry.

Figure 1A:
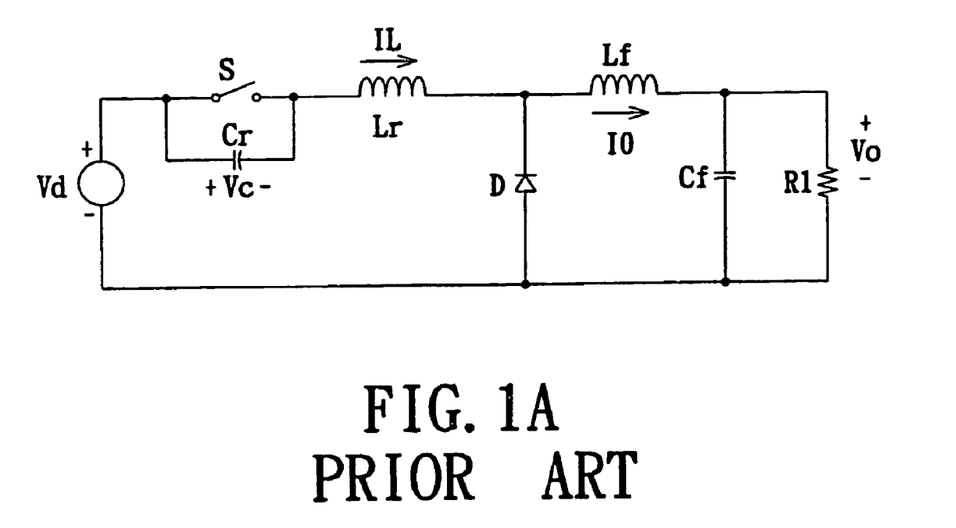
FIG. 1A shows a conventional voltage-drop type resonance converter having zero voltage switching.

FIG. 1A shows a conventional voltage-drop type resonance converter having zero voltage switching. This kind of converter makes use of a resonance capacitor in shunt with a switch to produce a zero voltage so that zero voltage switching can be accomplished for the switch.

Although the above zero voltage switching technique can reduce the switching loss generated when switching due to zero voltage switching, the resonance circuit will cause a large number of tank currents, which will cause transmission loss in the circuit. This transmission loss will seriously affect the supply and transmission of power to lower the conversion efficiency of the power source.

Accordingly, the present invention aims to provide a switching power conversion circuit, which not only can accomplish zero voltage switching with a simple circuit to lower the switching loss, but also can diminish the generation of tank current to greatly lower the transmission loss.

SUMMARY OF THE INVENTION

One object of the present invention is to provide a switching power conversion circuit, which makes use of a first switching inductance coil assembly and a second switching inductance coil assembly, which are magnetically coupled together, for power switching. Through the saturation effect of a saturable reactor, the terminal potential of the saturable reactor before switching will drop to let the terminal potential of the switch be zero.

The various objects and advantages of the present invention will be more readily understood from the following detailed description when read in conjunction with the appended drawing, in which:

DETAILED DESCRIPTION OF THE PREFERRED EMBODIMENTS

Figure 2:
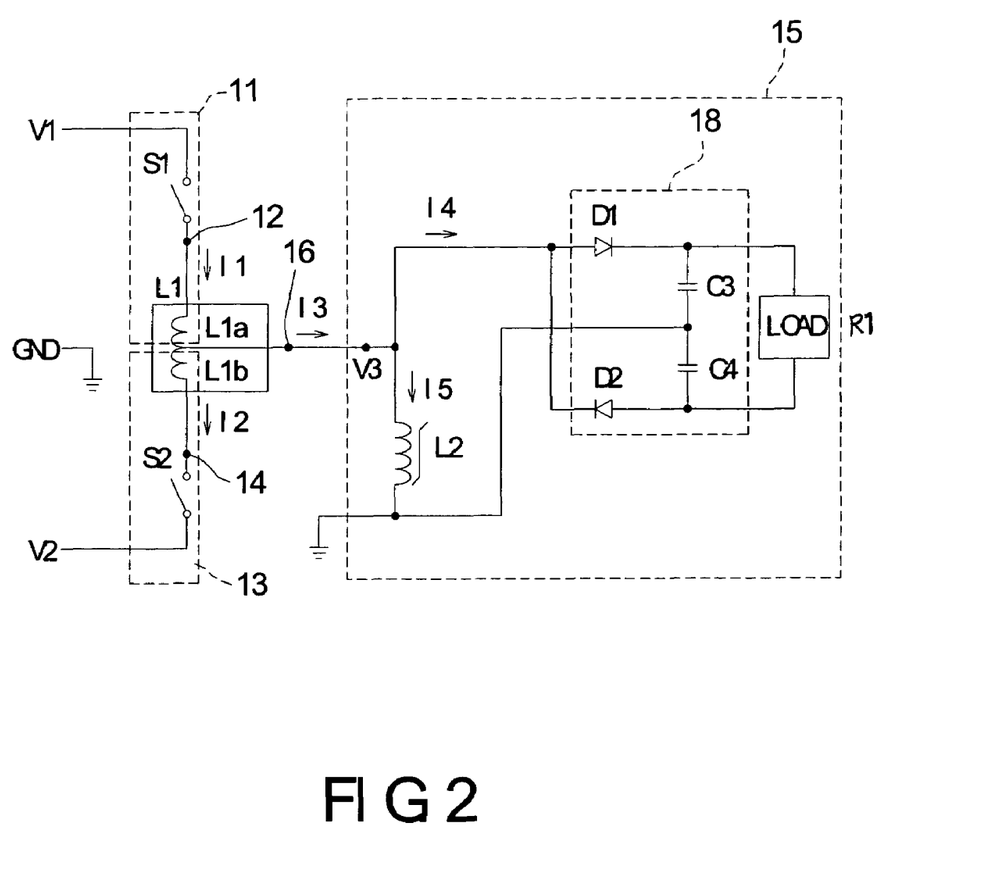
FIG. 2 is a diagram of a switching power conversion circuit according to a first embodiment of the present invention.

Please refer to FIG. 2. A first switching inductance coil assembly 11 is formed by series connecting a first switch S1 and a first coil L1a. A second switching inductance coil assembly 13 is formed by series connecting a second switch S2 and a second coil L1b. A saturable load assembly 15 is formed by connecting a load R1 with a saturable reactor L2 via a rectifying circuit 18. The first coil L1a and the second coil L1b are magnetically coupled to form a primary inductance coil L1 having a middle terminal 16 at the middle portion thereof. That is, this middle terminal 16 divides the primary inductance coil L1 into the first coil L1a and the second coil L1b. The other terminal of the first coil L1a is a first terminal 12 of the primary inductance coil L1, and the other terminal of the second coil L1b is a second terminal 14 of the primary inductance coil L1. The first terminal 12 is connected to one terminal of the first switch S1, and the second terminal 14 is connected to one terminal of the second switch S2. The other terminal of the first switch S1 is connected to a first potential V1, and the other terminal of the second switch S2 is connected to a second potential V2. The middle terminal 16 of the primary inductance coil L1 is connected to one terminal of the saturable reactor L2. The other terminal of the primary inductance coil L1 is connected to a reference potential GND. The rectifying circuit 18 is connected with two terminals of the saturable reactor L2 to provide power for the load R1. The rectifying circuit 18 is composed of a first diode D1, a second diode D2, a third capacitor C3 and a fourth capacitor C4.

Figure 3:
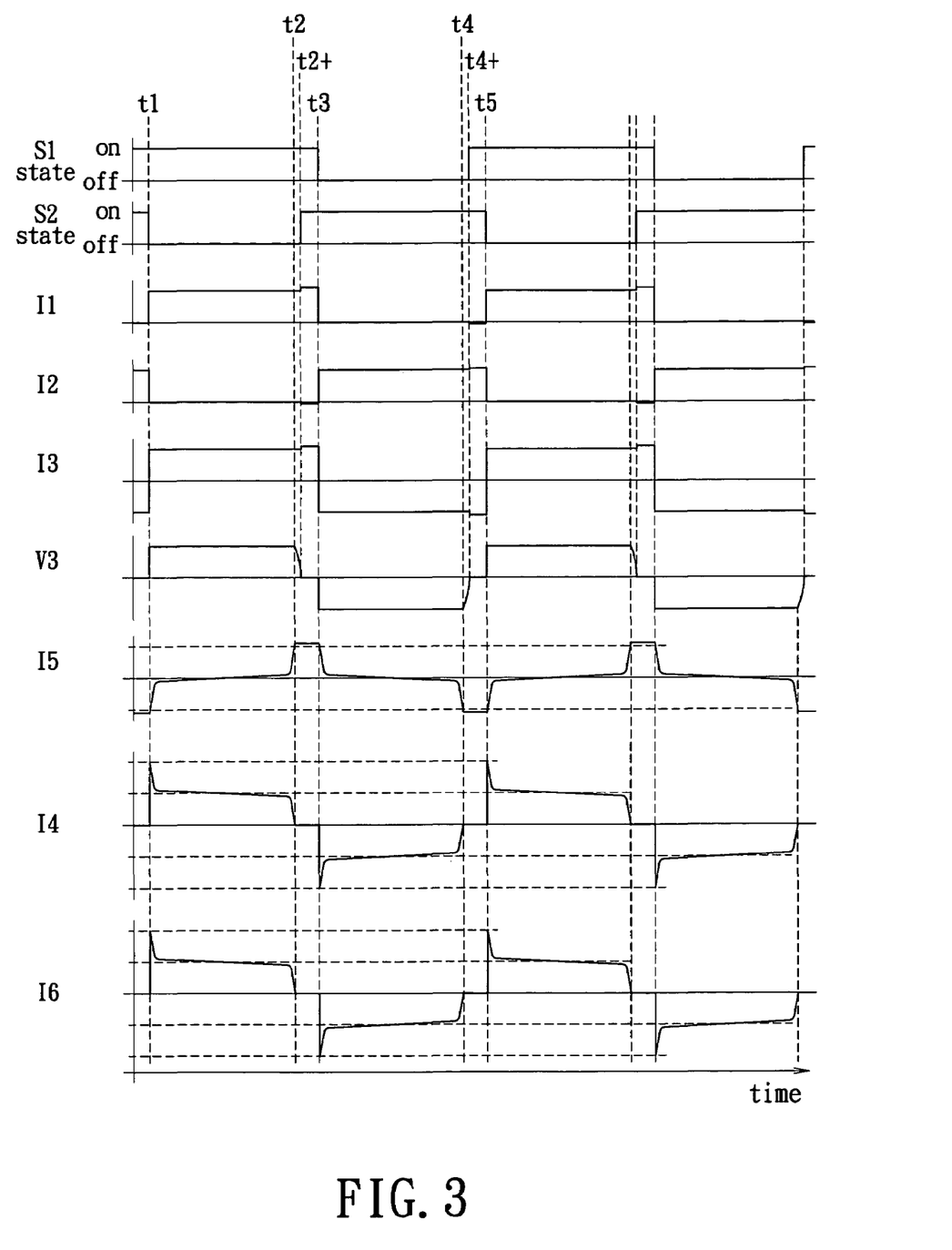
FIG. 3 is an operational waveform diagram of the present invention.

Please refer to FIG. 3 and also FIG. 2, The vertical axis represent the waveforms of S1, S2, I1, I2, I3, V3, I5, I6 and I4, respectively, and the horizontal axis represents time. At the time from t1 to t2, the first switch S1 is on while the second switch S2 is off. Meanwhile, the first coil L1a will accept power from the first potential V1 to generate the first current I1. Because the second switch S2 is off, the second current I2 is zero. The first current I1 flows out of the middle terminal 16 to form the second current I3. Because the saturable reactor L2 has the characteristic of repelling abrupt increase of current, the fifth current I5 flowing through the saturable reactor is almost zero, and all the third current I3 almost flows to the rectifying circuit 18 to form the fourth current I4. After rectification of the rectifying circuit 18, the power is provided for the load R1. At this time, the voltage V3 of the middle terminal 16 is equal to the sum of the first potential V1 and a flyback voltage of the first coil L1$a$, and the first current I1, the third current I3 and the fourth current I4 are almost the same.

At the time from t2 to t2+, the first switch S1 is still on. Meanwhile, the first current I1, the second current I2 and the third current I3 still keep invariable. Because the saturable reactor L2 saturates at this time, all the third current I3 will almost flow to the saturable reactor L2 so that the fifth current I5 is almost the same as the third current I3 and the fourth current I4 is zero. Because the saturable reactor L2 saturates, the potential across its two terminals, i.e., the voltage V3 of the middle terminal 16, will drop toward the reference potential GND. Because the first terminal 12 of the primary inductance coil L1 is still at the first potential V1, a reverse voltage will be induced at the second terminal 14. The reverse voltage will approach to the second potential V2 along with drop of the voltage of the middle terminal 16. The terminal voltage of the second switch S2 can thus be zeroed at t=t2+ so that the second switch S2 will be on at this time, hence accomplishing the object of zero voltage switching.

At the time from t3 to t4, the first switch S1 is off while the second switch S2 is on. The second coil L1$b$ will accept power from the second potential V2 to produce the second current I2. Because the first switch S1 is off, the first current I1 is zero. The second current I2 flows through the middle terminal 16, and is in the reverse direction of the third current I3. Meanwhile, the saturable reactor L2 will quickly restore to its original state and repels abrupt increase of current, hence letting the fifth current I5 drop to zero. Therefore, all the third current I3 almost flows to through the rectifying circuit 18 to form the fourth current I4. After rectification of the rectifying circuit 18, the power is provided for the load R1. At this time, the voltage V3 of the middle terminal 16 is equal to the sum of the second potential V2 and a flyback voltage of the second coil L1$b$, and the second current I2, the third current I3 and the fourth current I4 are almost the same.

At the time from t4 to t4+, the second switch S2 is still on. Meanwhile, the first current I1, the second current I2 and the third current I3 still keep invariable. Because the saturable reactor L2 saturates again at this time, all the third current I3 will almost flow to the saturable reactor L2 so that the fifth current I5 is almost the same as the third current I3 and the fourth current I4 is zero. Because the saturable reactor L2 saturates, the potential across its two terminals, i.e., the voltage V3 of the middle terminal 16, will drop toward the reference potential GND. Because the second terminal 14 of the primary inductance coil L1 is still at the second potential V2, a reverse voltage will be induced at the first terminal 12. This reverse voltage will approach to the first potential V1 along with drop of the voltage of the middle terminal 16. The terminal voltage of the first switch S1 can thus be zeroed at t=t4+ so that the first switch S1 will be on at this time, hence accomplishing the object of zero voltage switching.

As stated above, when the first switch S1 is on and the second switch S2 is off, the required power of the load R1 is provided by the first potential V1 and the flyback energy of the first coil L1$a$; when the first switch S1 is off and the second switch S2 is on, the required power of the load R1 is provided by the second potential V2 and the flyback energy of the second coil L1$b$. When the saturable reactor L2 saturates, the voltage across its two terminals is zero, controlling the first switch S1 and the second switch S2 to be on simultaneously. The primary inductance coil L1 can thus get energy from the first potential V1 and the second potential V2 until the switching action is finished. Moreover, each time when the voltage V3 of the middle terminal 16 drops toward the reference potential GND due to saturation of the saturable reactor L2, the terminal voltage of the opened switch will return to zero to accomplish zero voltage switching.

Figure 4:
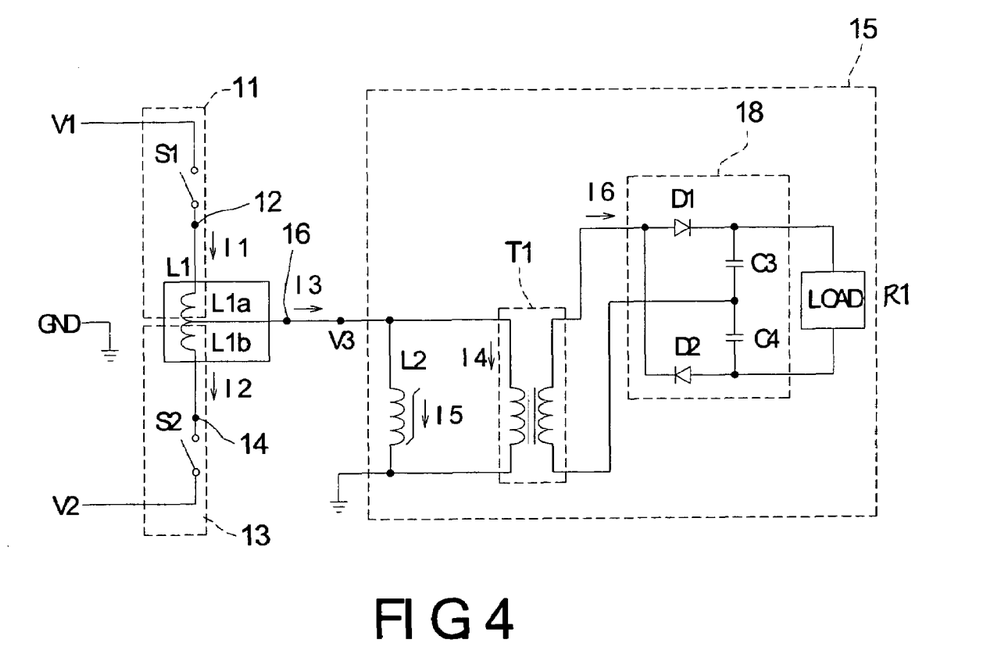
FIG. 4 is a diagram of another switching power conversion circuit according to the first embodiment of the present invention.

Please refer to FIG. 4. A first transformer T1 is connected between the saturable reactor L2 and the rectifying circuit 18. Safe isolation of circuit can be provided by the isolation property between a primary coil and a secondary coil of the first transformer T1. The fourth current I4 flows through the primary coil of the first transformer T1 to simultaneously induce a secondary current I6 at the secondary coil. The ratio of this secondary current I6 to the fourth current I4 is a coil turn N. This secondary current I6 flows through the rectifying circuit 18 to provide power for the load R1. The operation waveforms are also shown in FIG. 3.

Figure 5:
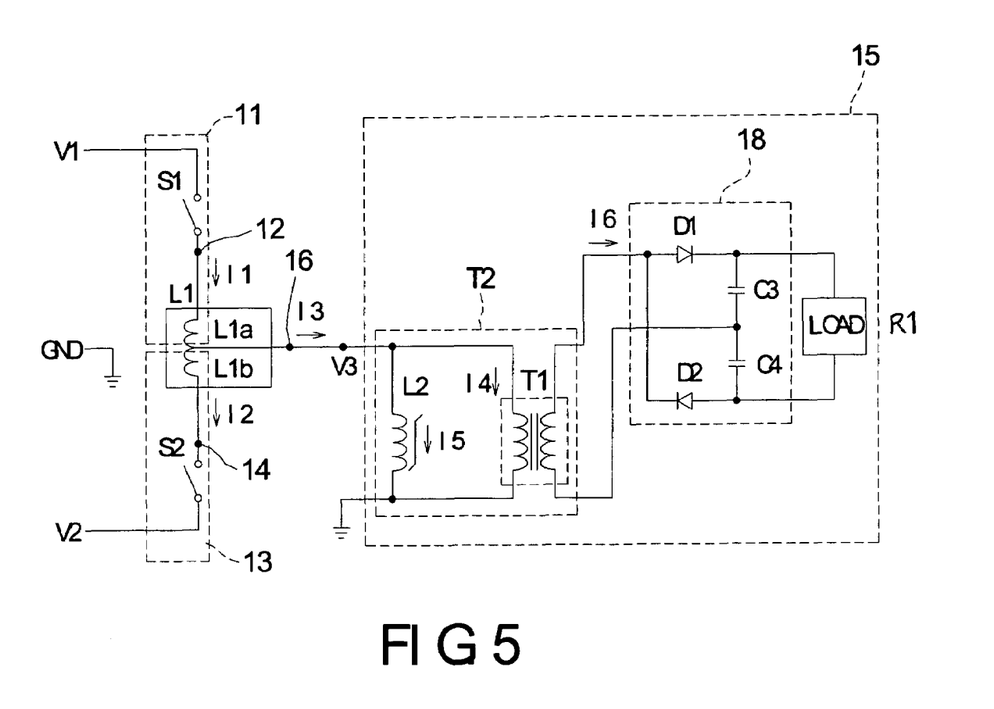
FIG. 5 is a diagram of yet another switching power conversion circuit according to the first embodiment of the present invention.

Please refer to FIG. 5 and also FIG. 4. The saturable reactor L2 and the first transformer T1 can be replaced with a first saturable transformer T2. The operation waveforms are also shown in FIG. 3.

Figure 6:
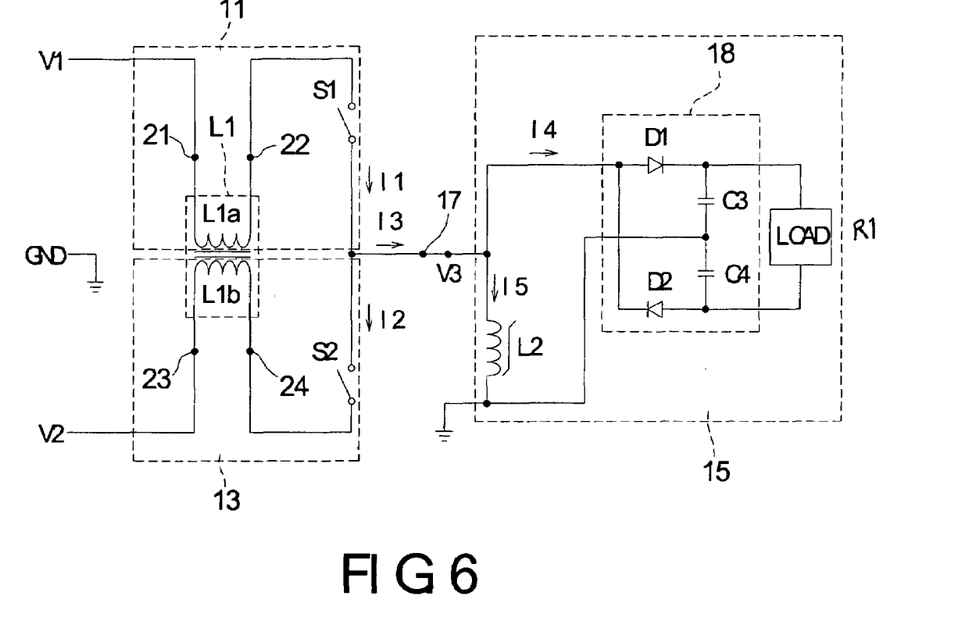
FIG. 6 is a diagram of further another switching power conversion circuit according to the first embodiment of the present invention.

Please refer to FIG. 6 and also FIG. 2. The positions of the switches and the coils in the first and second switching inductance coil assemblies are exchanged. The terminals of the first coil L1$a$ include a first terminal 21 and a second terminal 22, and the terminals of the second coil L1$b$ include a third terminal 23 and a fourth terminal 24. The first terminal 21 is connected to the first potential V1. The third terminal 23 is connected to the second potential V2. The second terminal 22 is connected to one terminal of the first switch S1. The fourth terminal 24 is connected to one terminal of the second switch S2. The other terminals of the first switch S1 and the second switch S2 form a common contact 17 connected to one terminal of the saturable reactor L2.

The switching actions and operation waveforms of the circuit shown in FIG. 6 are the same as those of the circuit shown in FIG. 2.

Figure 7:
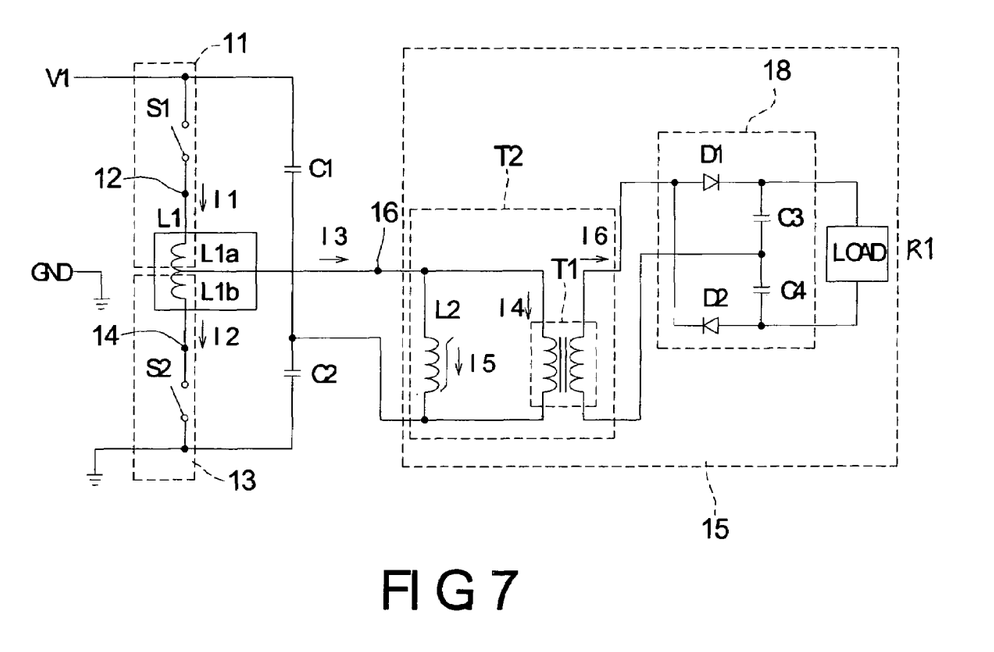
FIG. 7 is a diagram of a switching power conversion circuit according to a second embodiment of the present invention.

Please refer to FIG. 7. A first switching inductance coil assembly 11 is formed by series connecting a first switch S1 and a first coil L1$a$. A second switching inductance coil assembly 13 is formed by series connecting a second switch S2 and a second coil L1$b$. A saturable load assembly 15 is formed by connecting a load R1, a rectifying circuit 18, a transformer T1 and a saturable reactor L2. The first coil L1$a$ and the second coil L1$b$ are magnetically coupled to form a primary inductance coil L1 having a middle terminal 16. That is, this middle terminal 16 divides the primary inductance coil L1 into the first coil L1$a$ and the second coil L1$b$. The other terminal of the first coil L1$a$ is a first terminal 12 of the primary inductance coil L1, and the other terminal of the second coil L1$b$ is a second terminal 14 of the primary inductance coil L1. The first terminal 12 is connected to one terminal of the first switch S1, and the second terminal 14 is connected to one terminal of the second switch S2. The other terminal of the first switch S1 is connected to a first potential V1, and the other terminal of the second switch S2 is connected to a reference potential GND. The middle terminal 16 of the primary inductance coil L1 is connected to one terminal of the saturable reactor L2. A first capacitor C1 and a second capacitor C2 are added in this circuit. One terminal of the first capacitor C1 is connected to the first potential V1. The other terminal of the first capacitor C1 is connected to one terminal of the second capacitor C2 and the other terminal of the saturable reactor L2. The other terminal of the second capacitor C2 is connected to the reference potential GND and the second switch S2. The first and second switching inductance coil assemblies 11 and 13 are used for power switching. Through the saturation effect of the saturable reactor L2, the terminal potential of the switches before conduction can be zeroed.

Please refer to FIG. 7 again. The first potential V1 first charges the first and second capacitors C1 and C2. Through switching of the first and second switches S1 and S2, the energy stored on the first and second capacitors C1 and C2 will be transferred through the first transformer T1 and the rectifying circuit 18 to provide power for the load R1. When the saturable reactor L2 saturates, the potential across its two terminals will approach zero. Meanwhile, the first switch S1 and the second switch S2 are controlled to be on simultaneously. Because the saturable reactor L2 saturates, a zero voltage will exist across two terminals of the switches before switching because the potential across the two terminals of the saturable reactor L2 approaches zero, hence accomplishing zero-voltage crossover to reduce the switching loss. The saturable reactor L2 and the first transformer T1 can be replaced with a first saturable transformer T2. The operation waveforms are also shown in FIG. 3.

Figure 8:
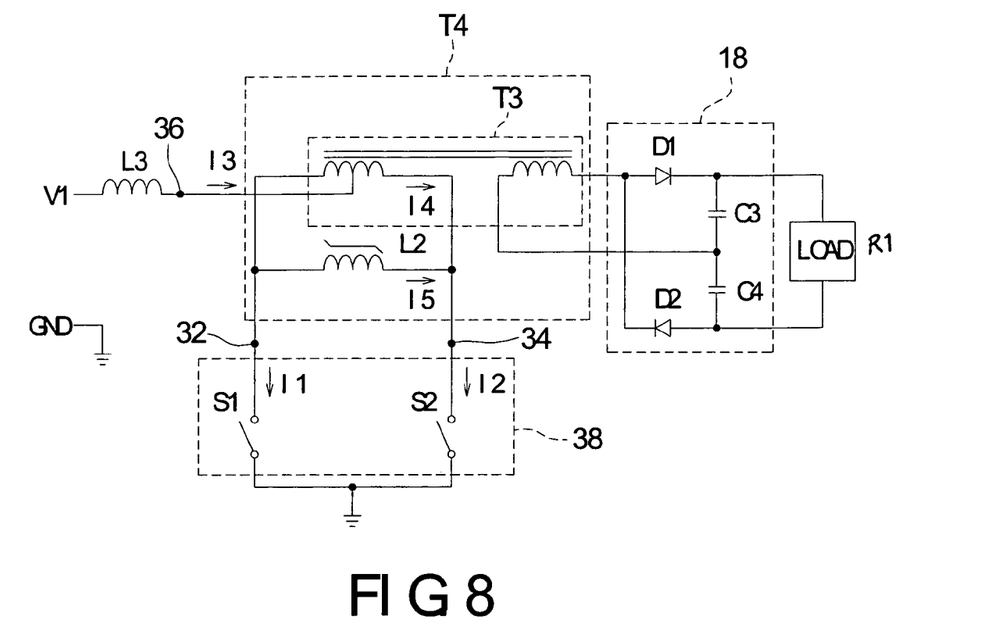
FIG. 8 is a diagram of a switching power conversion circuit according to a third embodiment of the present invention.

Please refer to FIG. 8. A second transformer T3 includes a first primary coil, a second primary coil, and a secondary coil. The first and second primary coils are connected to exterior via a first terminal 32, a second terminal 34 and a middle tap terminal 36. The secondary coil is connected to a rectifying circuit 18. A saturable reactor L2 is connected to the first terminal 32 and the second terminal 34. A load R1 is connected to the rectifying circuit 18. A switching circuit 38 is connected to the first terminal 32 and the second terminal 34. A first switch S1 is series connected with the first primary coil to form a first switching primary coil assembly. A second switch S2 is series connected with the second primary coil to form a second switching primary coil assembly. One terminal of a reactor L3 is connected to the middle tap terminal 36, and the other terminal of the reactor L3 is connected to a first potential V1. A reference potential (a zero voltage) is also provided.

The above switching circuit 38 is used for power switching. Through the saturation effect of the saturable reactor L2, a zero voltage will exist across two terminals of the switching circuit 38 to let the first terminal 32 and the second terminal 34 be at a zero potential when switching. The switching circuit 38 is composed of the first switch S1 and the second switch S2. One terminals of the first and second switches S1 and S2 are series connected with the first terminal 32 and the second terminal 34, respectively, and the other terminals of the first and second switches are jointly connected with the reference potential GND.

Please refer to FIG. 8 again. When the first switch S1 is on, the first potential V1 will provide power through the second transformer T3 to the rectifying circuit 18 and then to the load R1. When the saturable reactor L2 saturates, the voltage across its two terminals will drop to let the terminal potential of the second switch S2 be zero. Meanwhile, the second switch S2 is on to accomplish zero voltage switching. The saturable reactor L2 and the second transformer T3 can be replaced with a second saturable transformer T4. The operation waveforms are also shown in FIG. 3.

Figure 9:
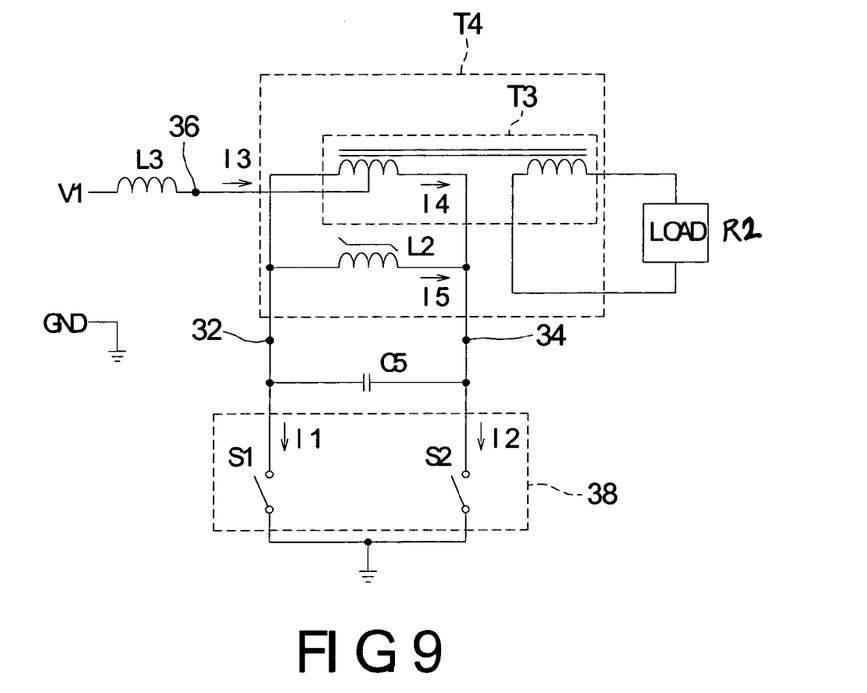
FIG. 9 is a diagram of another switching power conversion circuit according to the third embodiment of the present invention.

Please refer to FIG. 9. A fifth capacitor C5 is connected between any one or a series assembly of coils of the second transformer T3. The rectifying circuit connected to the secondary coil of the second transformer T3 in FIG. 8 is replaced with an AC load R2. The fifth capacitor C5 can be parasite capacitance generate by other peripheral circuits or winding in the second transformer T3. The fifth capacitor C5 can resonate with the inductance of the second transformer T3 to tune the switching frequency of the conversion circuit. The first potential V1 can provide AC power to the AC load through the second transformer T3. Because of the saturation effect of the saturable reactor L2, zero-voltage crossover can be accomplished at the first and second terminals 32 and 34 when switching. Moreover, the tank current flowing through the fifth capacitor C5 will substantially be replaced by the saturation current in the saturable reactor L2 to reduce the tank current flowing through the induction coil of the transformer due to the saturation effect, hence effectively lowering the transmission loss during switching. The operation waveforms are also shown in FIG. 3.

Figure 1B:
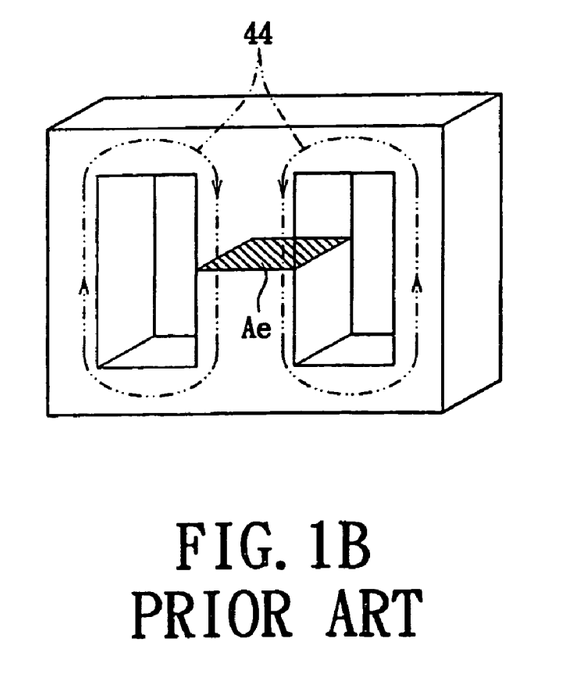
FIG. 1B is a perspective view of the magnetic core of a conventional transformer.

Please refer to FIG. 1B. The cross-sectional area of a magnetic flux path 44 is Ae. When the transformer is electrified, the magnetic flux will pass through the magnetic flux path 44 to output a voltage due to electromagnetic induction. If the magnetic flux is too high, saturation will occur on the magnetic flux path 44. This saturation effect can randomly happen at any portion of the magnetic flux path to let the transformer malfunction.

Figure 10:
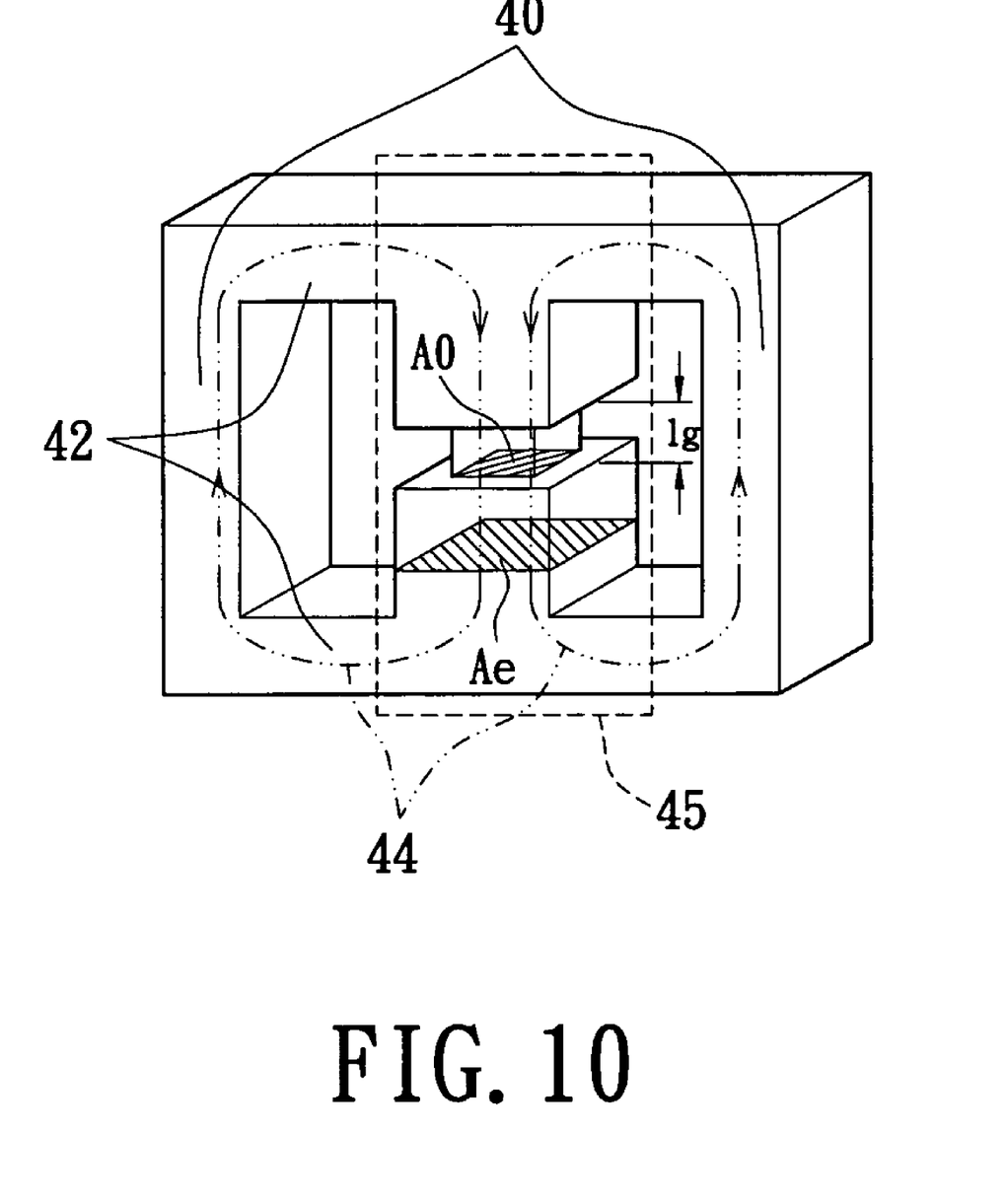
FIG. 10 is a perspective view of the magnetic core of a saturable transformer of the present invention.

FIG. 10 is a perspective view of the magnetic core of a saturable transformer of the present invention. The saturable transformer comprises a pair of side columns 40, a pair of shoulder columns 42, and a central column 45. Two ends of the pair of shoulder columns 42 are connected to two ends of the pair of side columns 40, respectively. Two ends of the central column 45 are connected to the pair of side columns 40 via the pair of shoulder columns 42. The cross-sectional area Ae at the center of the central column 45 is decreased to form a central cross-sectional area A0 with a length of 1 g. The central cross-sectional area is smaller than the cross-sectional area at two ends. When the transformer is electrified, the magnetic flux will pass through the magnetic flux path 44 to output a voltage due to electromagnetic induction. If the magnetic flux is too high, saturation will first occur at the central cross-sectional portion to achieve the characteristic of a saturable reactor. The magnetic flux at two ends of the magnetic flux path 44 won't saturate so that the transformer will work normally. Therefore, the transformer having the saturable magnetic core can be used as the above saturable transformer.

To sum up, the switching power conversion circuit of the present invention can let the terminal potential of a switch be zero through the saturation effect of a saturable reactor to reduce the switching loss. Moreover, due to the saturation effect of the saturable reactor, transmission loss generated during switching can also be effectively decreased.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A switching power conversion circuit comprising:
    a saturable load assembly including a load and a saturable reactor;

a first switching inductance coil assembly formed by series connecting a first switch and a first coil, said first switching inductance coil assembly being connected to said saturable load assembly and a first potential; and a second switching inductance coil assembly formed by series connecting a second switch and a second coil, said second switching inductance coil assembly being connected to said first switching inductance coil assembly and a second potential, said first and second switching inductance coil assemblies being magnetically coupled together;

whereby when both said first and second switches are on, said first potential and said second potential magnetize said first and second coils, and when said first and second switches are alternately off, the magnetic energy of said first and second coils is transferred to said saturable load assembly, and responsive to the saturation effect of said saturable reactor the terminal potential of the off switch becomes zero after a certain period of time, the off switch turning on at this time.

2. The switching power conversion circuit as claimed in claim 1, wherein each of said first coil and said second coil includes a primary inductance coil.

3. The switching power conversion circuit comprising as claimed in claim 1, wherein said load is connected via a rectifying circuit.

4. The switching power conversion circuit comprising as claimed in claim 1, wherein said load or said saturable load assembly is connected via a transformer.

5. A switching power conversion circuit comprising:

a saturable transformer comprising a first primary coil, a second primary coil, and a secondary coil connected to a load;

a first switching primary coil assembly formed by series connecting a first switch and said first primary coil; and a second switching primary coil assembly formed by series connecting a second switch and said second primary coil, said first and second switching primary coil assemblies being series connected together with their contact being connected to a reactor, an outer terminal of said reactor being connected to a first potential, outer terminals of said first and second switching primary coil assemblies being connected to a reference potential;

whereby when both said first and second switches are on, said first and second primary coils will be equivalently short-circuited due to mutual induction, said first potential being applied to magnetize said reactor, and when said first and second switches are alternately off, the magnetic energy of said reactor being transferred to said first and second primary coils, and responsive to the saturation effect of said saturable transformer the terminal potential of the off switch becomes zero after a certain period of time, the off switch turning on at this time.

6. A switching power conversion circuit comprising:

a transformer comprising a first primary coil, a second primary coil, and a secondary coil connected to a load;

a saturable reactor connected across at least one of said coils of said transformer;

a first switching primary coil assembly formed by series connecting a first switch and said first primary coil; and a second switching primary coil assembly formed by series connecting a second switch and said second primary coil, said first and second switching primary coil assemblies being series connected together with their contact being connected to a reactor, an outer terminal of said reactor being connected to a first potential, outer terminals of said first and second switching primary coil assemblies being connected to a reference potential;

whereby when both said first and second switches are on, said first and second primary coils will be equivalently short-circuited due to mutual induction, said first potential being applied to magnetize said reactor, and when said first and second switches are alternately off, the magnetic energy of said reactor being transferred to said first and second primary coils, and responsive to the saturation effect of said saturable reactor the terminal potential of the off switch becomes zero after a certain period of time, the off switch turning on at this time.

7. The switching power conversion circuit comprising as claimed in claim 6, wherein a rectifying circuit is connected between said secondary coil of said transformer and said load.

8. The switching power conversion circuit comprising as claimed in claim 6, wherein a capacitor is further connected across at least one of said coils of said transformer.

9. A switching power conversion circuit comprising:

a saturable load assembly including a load and a saturable transformer;

a first switching inductance coil assembly formed by series connecting a first switch and a first coil, said first switching inductance coil assembly being connected to said saturable load assembly and a first potential; and a second switching inductance coil assembly formed by series connecting a second switch and a second coil, said second switching inductance coil assembly being connected to said first switching inductance coil assembly and a second potential, said first and second switching inductance coil assemblies being magnetically coupled together;

whereby when both said first and second switches are on, said first potential and said second potential magnetize said first and second coils, and when said first and second switches are alternately off, the magnetic energy of said first and second coils is transferred to said saturable load assembly, and responsive to the saturation effect of said saturable transformer the terminal potential of the off switch becomes zero after a certain period of time, the off switch turning on at this time.

\* \* \* \* \*